United States Patent
Proger et al.

(10) Patent No.: US 6,367,892 B1
(45) Date of Patent: Apr. 9, 2002

(54) METHOD OF TERMINATING ELECTRONIC BRAKE FORCE DISTRIBUTION

(75) Inventors: Thomas Proger, Rodermark; Markus Zenzen, Hattersheim, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/155,319

(22) PCT Filed: Mar. 27, 1997

(86) PCT No.: PCT/EP97/01578

§ 371 Date: Mar. 25, 1999

§ 102(e) Date: Mar. 25, 1999

(87) PCT Pub. No.: WO97/38882

PCT Pub. Date: Oct. 23, 1997

(30) Foreign Application Priority Data

Apr. 13, 1996 (DE) .......................... 196 14 630

(51) Int. Cl.⁷ .............................. B60T 8/62
(52) U.S. Cl. ................. 303/186; 303/9.62; 303/113.5
(58) Field of Search ........................... 303/9.62, 113.5, 303/156, 157, 158, 176, 177, 186

(56) References Cited

U.S. PATENT DOCUMENTS

| 5,125,724 | A | * | 6/1992 | Steiner ................... 303/115.4 |
| 5,281,012 | A | * | 1/1994 | Binder et al. ............. 303/113.5 |
| 5,297,861 | A | * | 3/1994 | Morita et al. ............. 303/113.5 |
| 5,547,264 | A | * | 8/1996 | Tozu et al. ................. 303/9.62 |
| 5,558,415 | A | * | 9/1996 | Buschmann et al. ......... 303/186 |
| 5,700,074 | A | * | 12/1997 | Sugimoto et al. ........... 303/186 |
| 5,887,957 | A | * | 3/1999 | Buttner et al. .............. 303/186 |
| 5,899,540 | A | * | 5/1999 | Burgdorf et al. ............ 303/186 |

FOREIGN PATENT DOCUMENTS

| DE | 2215608 | 10/1973 |
| DE | 2722435 | 11/1978 |
| DE | 3728480 | 1/1989 |
| DE | 3934307 | 4/1991 |
| DE | 4224971 | 2/1994 |
| DE | 4337498 | 5/1994 |
| DE | 4309243 | 9/1994 |
| DE | 19501760 | 7/1996 |
| WO | 90/11916 | 10/1990 |

* cited by examiner

Primary Examiner—Robert J. Oberleitner
Assistant Examiner—Mariano Sy
(74) Attorney, Agent, or Firm—Rader, Fishman & Grauer PLLC

(57) ABSTRACT

The present invention discloses a brake system with electronic brake force distribution which includes additional criteria of deactivation of the electronic brake force distribution. Deactivation of the electronic brake force distribution is intended to occur, on the one hand, if a pressure increase phase lasts longer than a defined time (50). On the other hand, another criterion of deactivation (60) is deceleration-responsive, and an additional check is made whether or not braking is pedal operated (62).

6 Claims, 1 Drawing Sheet

METHOD OF TERMINATING ELECTRONIC BRAKE FORCE DISTRIBUTION

Figure 1:
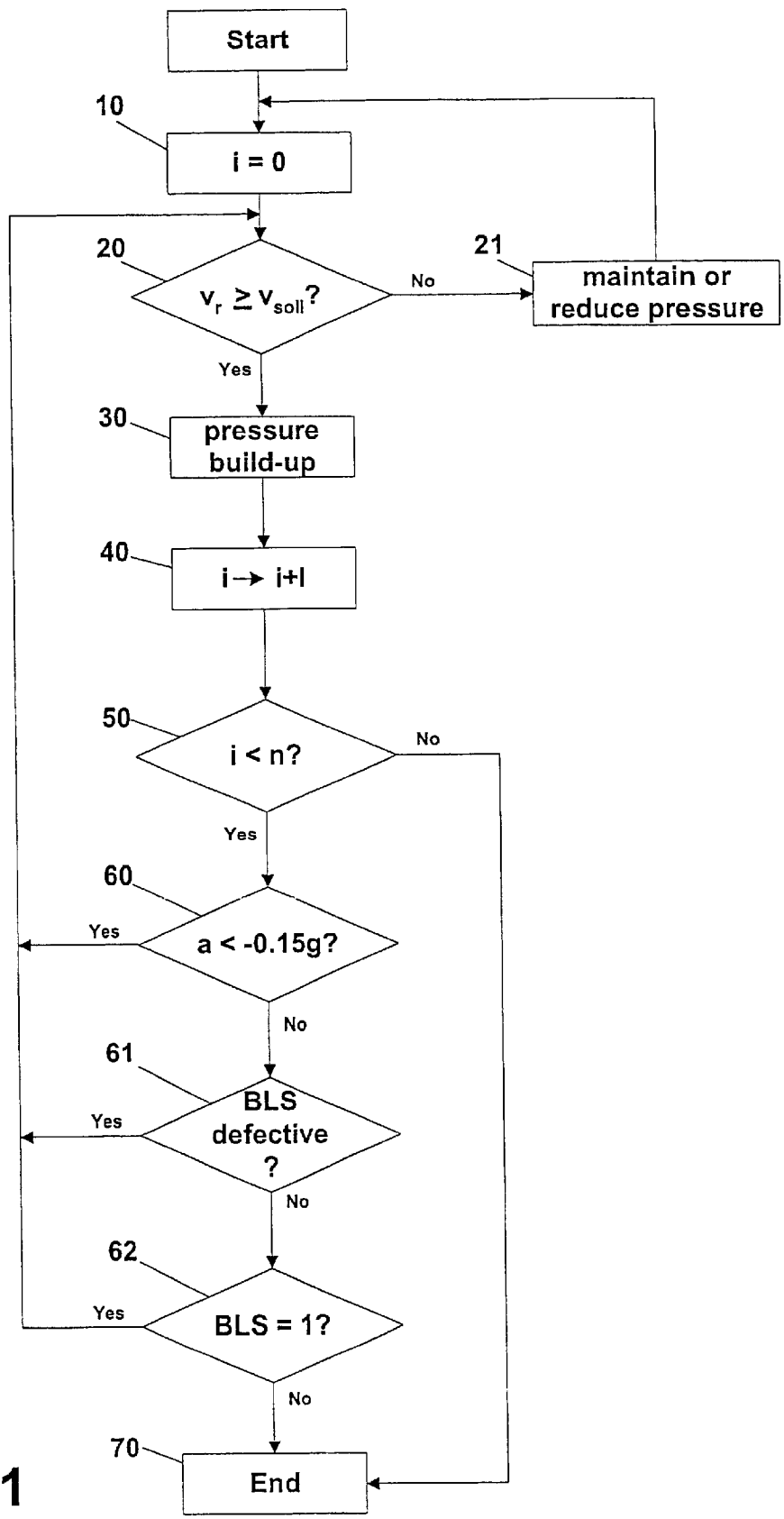

The present invention relates to a brake system with electronic brake force distribution according to the preamble of claim 1.

A brake system of this type is disclosed in German patent application No. 43 37 498. The prior art brake system controls the brake force applied to the rear wheels in relation to the brake force applied to the front wheels in order to ensure ideal brake force distribution. Pressure control valves are arranged in a hydraulic circuit which connects the master cylinder of the brake system to the rear-wheel brakes. There is provision of an auxiliary power source to supply an outlet pressure and a hydraulic booster to modulate the braking pressure and to actuate the master cylinder. A change-over valve is interposed between the master cylinder and the control valve and selectively movable into a first operating position connecting the control valves to the master cylinder and closing the connection between the control valves and the hydraulic booster, and into a second operating position connecting the control valves to the hydraulic booster and closing the connection between the control valves and the master cylinder. When the change-over valve is shifted from the first operating position to the second operating position, the control valves will control the hydraulic pressure in the rear-wheel cylinders corresponding to the predetermined relation to the front-wheel braking pressure. The commencement of this control depends upon whether or not a defined start condition is satisfied. Defined criteria must be given: The brake light switch must be activated, the vehicle speed must have exceeded a determined threshold value and the vehicle acceleration must have fallen short of a determined negative threshold value. Finally, the wheel speed of the rear wheel which necessitates braking pressure control must fall short of the wheel speed of the front wheel that lies in front thereof by a defined amount. If these conditions are satisfied, electronic brake force distribution will set in. Distribution is discontinued as soon as either the brake light switch is deactivated (which means that the driver has removed his foot from the brake pedal) or the vehicle acceleration exceeds a determined negative threshold value which does not have to be identical to that one of the start conditions.

Electronic brake force distribution should only be effected when it is needed. Therefore, a deactivation criterion which is irrespective of the position of the brake light switch is certainly an expedient supplementation. However, calculating the vehicle acceleration at very low wheel speeds involves a large number of errors because wheel sensors at low speeds do not issue exact data about the vehicle velocity. Besides, there are brake systems with start conditions for the entry into electronic brake force distribution which are independent of whether or not pedal-operated braking exists. This means that, under certain circumstances, electronic brake force distribution is initiated when driving through a road hole or caused by any other road surface disturbance which took effect on the speed of a single wheel. Finally, it is still possible that malfunction of a brake light switch is not detected, or that it is not recognized due to malfunction of a brake light switch that the driver has already terminated pedal-operated brake application.

To ensure deactivation of the electronic brake force distribution and to avoid unnecessary valve actuation even in such cases, an object of the present invention is to achieve a brake system of the above-mentioned type which triggers deactivation of the electronic brake force distribution independently of the application of the brake pedal and irrespective of exceeding a defined vehicle acceleration in the absence of need for pressure reduction at the rear-wheel brakes.

This object is achieved in connection with the characterizing features of claim 1. The principle of the present invention includes recognizing that the driver, in spite of continuing braking, does not have the intention to decelerate greatly. One may consider this assumption given if a braking situation lasts longer than 7 seconds, for example, which situation necessitates neither reducing the braking pressure nor maintaining the braking pressure on the rear axle but, on the contrary, would easily be able to generate a still greater brake torque.

A second condition may be applicable in parallel, and the electronic brake force distribution will then be discontinued as soon as any one of the two conditions is satisfied. This second condition may then be the exceeding of a defined negative vehicle acceleration.

In parallel to this second condition, or in addition thereto, it can be checked whether pedal-operated braking continues to exist. Because the identification of pedal-operated braking depends on the position of a brake light switch, it is advisable to integrate brake light switch error detection into the brake system to prevent premature termination of the electronic brake force distribution due to a defective brake light switch.

The idea of the present invention will be explained in detail hereinbelow by way of the description of an embodiment in one FIGURE.

The only FIGURE shows in a flow chart the individual steps upon interrogation of the deactivation criteria of the electronic brake force distribution.

Initially, a counter is set to zero in step 10 unless this has been done at another location in order to permit time measurement. Thus, time is measured in the present flow chart by counting the program runs, the so-called 'loops'. Other possibilities of time measurements include, for example, counting valve switch pulses. There is a poll in step 20 whether the wheel speeds $v_r$ of the rear wheels are in excess of a predetermined nominal speed $v_{soll}$. The nominal speed can be derived from the wheel speed of the front wheel which lies in front of the rear wheel concerned, for example. A defined discrepancy may be permitted.

When the rear-wheel speed $v_r$ is lower than the nominal speed $v_{soll}$, a pressure maintain phase or a pressure reduction phase according to step 21 must be initiated, the exact course of which is not the subject matter of the present invention and, therefore, shall not be described in detail.

In case, however, that the rear-wheel speed has reached or exceeded a nominal speed, braking pressure increase is performed in step 30.

Subsequently, counter i which designates the number of program runs through the pressure increase phase is increased by 1 in step 40.

Afterwards, step 50 questions how long the condition of the pressure increase phase lasts already. To this end, counter i is compared with an invariable number n which represents a defined real time.

As soon as the number n of program runs is reached, the electronic brake force distribution will be deactivated which is referred to as 'end' in step 70. This is done irrespective of the extent by which the rear-wheel speed $v_r$ exceeds its nominal value $v_{soll}$.

If, however, the number i of the program runs is still inferior to the number n, another deactivation criterion is polled in steps 60 to 62 in the present design of the invention. In a simpler design, steps 60 to 62 are omitted or replaced by other criteria.

In this embodiment, steps 60, 61 and 62 are arranged in series by an AND condition so that deactivation of the electronic brake force distribution is possible in step 70 only if all criteria are satisfied. The sequence of the poll is as desired. The first criterion in step 60 questions the vehicle longitudinal acceleration a. If a is lower than −0.15 g, for example, with g designating the gravitation, this means that there is still a significant vehicle deceleration. The deactivation criterion is removed in this case after step 60, and another program run takes place commencing step 20. If, however, the vehicle deceleration is low enough, that means, the vehicle acceleration a is higher or is equal to −0.15 g, step 61 interrogates whether the brake light switch signal is reliable. Only if the brake light switch is not defective will the signal of the brake light switch be taken into account in step 62, and the electronic brake force distribution is terminated in step 70 in case the brake light switch is deactivated. Should there be a defect of the brake light switch, or should the brake light switch indicate a pedal-operated brake application, another program run will start commencing step 20.

Should a pressure maintain phase or a pressure reduction phase occur in the further course, the interrogation cycle is restarted with a counter i=0. With the pressure increase phase continuing, only so many program runs will be performed until the counter i reaches the number n.

The present example takes into account a loop number for time measurement. Other appropriate criteria for time measurement are, for example, valve actuation pulses or other recurrent events which are spaced from one another by a certain interval. A time of seven seconds can be assumed as an appropriate time threshold for deactivation of the electronic brake force distribution during a pressure increase phase. When no pressure maintain or pressure reduction phase commences until this point of time, it may be assumed that the driver of the vehicle does not desire greater deceleration. It is expedient in this case to deactivate the electronic brake force distribution for noise damping reasons or, in general, for avoiding unnecessary valve actuations.

The inclusion of the deceleration criterion in step 60 permits the deactivation of the electronic brake force distribution even if its activation was caused by increased brake slip, due to a road disturbance, for example, irrespective of pedal-operated braking. This is because it is possible that such a road disturbance initially causes a certain vehicle deceleration which is, however, not due to pedal-operated braking. In this case, the additional criterion permits deactivation of the electronic brake force distribution at the moment where significant vehicle deceleration no longer prevails. However, interrogation of the brake light switch signal is additionally done for safety reasons.

What is claimed is:

1. Method of terminating a mode of electronic brake force distribution for a two-axle vehicle in which the electronic brake force distribution is carried out by variation of braking pressure of rear-axle brakes on command of an electronic control unit, wherein the electronic brake force distribution makes a distinction at least between pressure reduction phases and pressure increase phases, the method including the step of terminating the electronic brake force distribution if, according to a first condition, a pressure increase phase lasts for a defined time period wherein the electronic brake force distribution is deactivated prior to expiry of the defined time period if, according to a second condition, a vehicle acceleration exceeds a determined value $-k^*g$, wherein $0<k<1$ and $g=9.9=81$ m/sec$^2$ wherein the deactivation according to the second condition is effected only if there is no coincidental pedal-operated brake application by the driver of the vehicle.

2. Method as claimed in claim 1, wherein a brake light switch error detection is carried out, and wherein the deactivation according to the second condition is effected only if no such error is detected.

3. Method of terminating a mode of electronic brake force distribution for a two-axle vehicle in which the electronic brake force distribution is carried out by variation of braking pressure of rear-axle brakes on command of an electronic control unit, wherein the electronic brake force distribution makes a distinction at least between pressure reduction phases and pressure increase phases, the method including the step of terminating the electronic brake force distribution if, according to a first condition, a pressure increase phase lasts for a defined time period, and wherein the electronic brake force distribution is deactivated prior to expiry of the defined time period if, according to a second condition, a brake light switch error detection is carried out.

4. Method as claimed in claim 3, wherein the deactivation according to the second condition is effection only if the vehicle acceleration exceeds a determined value $-k^*g$, wherein $0 \leq k < 1$ and $g=9.81$ m/sec$^2$.

5. Method as claimed in claim 3, wherein the deactivation according to the second condition is effected only if there is no coincidental pedal-operated brake application by the driver of the vehicle.

6. Method of terminating a mode of electronic brake force distribution for a two-axle vehicle in which the electronic brake force distribution is carried out by variation of braking pressure of rear-axle brakes on command of an electronic control unit, wherein the electronic brake force distribution makes a distinction at least between pressure reduction phases and pressure increase phases, the method including the step of terminating the electronic brake force distribution if, according to a first condition, a pressure increase phase lasts for a defined time period, and wherein the electronic brake force distribution is deactivated prior to expiry of the defined time period if, according to a second condition, a vehicle acceleration exceeds a determined value $-k^*g$, wherein $0 \leq k < 1$ and $g=9.81$ m/sec$^2$, a brake light switch error detection is carried out, and there is no coincidental pedal-operated brake application by the driver of the vehicle.

* * * * *